United States Patent
Amacker

(10) Patent No.: US 9,686,350 B2
(45) Date of Patent: *Jun. 20, 2017

(54) WEB-BASED DISTRIBUTED COMPUTING WITH BROWSER-EXECUTED CODE

(71) Applicant: A9.com, Inc., Palo Alto, CA (US)

(72) Inventor: Matthew W. Amacker, Santa Clara, CA (US)

(73) Assignee: A9.COM, INC., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/863,308

(22) Filed: Sep. 23, 2015

(65) Prior Publication Data

US 2016/0191612 A1 Jun. 30, 2016

Related U.S. Application Data

(63) Continuation of application No. 14/585,060, filed on Dec. 29, 2014, now Pat. No. 9,172,770, which is a (Continued)

(51) Int. Cl.
G06F 15/16 (2006.01)
H04L 29/08 (2006.01)
G06F 9/50 (2006.01)
G06F 17/22 (2006.01)
G06F 17/27 (2006.01)
(Continued)

(52) U.S. Cl.
CPC ............ H04L 67/10 (2013.01); G06F 9/50 (2013.01); G06F 9/5027 (2013.01); G06F 9/5072 (2013.01); G06F 17/2241 (2013.01); G06F 17/2705 (2013.01); G06F 17/30486 (2013.01); H04L 67/02 (2013.01); H04L 67/42 (2013.01);
(Continued)

(58) Field of Classification Search
CPC ......... G06F 9/50; G06F 9/5027; G06F 9/5072
USPC ....................... 709/201, 203, 226
See application file for complete search history.

(56) References Cited

U.S. PATENT DOCUMENTS

2009/0217241 A1 8/2009 Motoyama et al.
2009/0254998 A1 10/2009 Wilson
(Continued)

OTHER PUBLICATIONS

"Notice of Allowance dated Sep. 10, 2014," U.S. Appl. No. 14/585,060, 8 pages.
(Continued)

Primary Examiner — Joseph Avellino
Assistant Examiner — Marshall McLeod
(74) Attorney, Agent, or Firm — Hogan Lovells US LLP

(57) ABSTRACT

A reusable distributed computing framework may be established in which contributors of computing resources may participate by using a web browser to visit a web page that incorporates a distributed computing participation component. A distributed computing job provider may submit distributed computing jobs to a web-based distributed computing service. A distributed computing job may include browser-executable code in accordance with a particular distributed computing programmatic interface and data to be processed by the browser-executable code. The web-based distributed computing service may assign independently processable portions of the job data to browsers visiting a donor page for processing with the job code. Results returned by the donor browsers may be indexed and made available in real-time, as may a status of the distributed computing job such as with respect to processing the job data.

20 Claims, 7 Drawing Sheets

Related U.S. Application Data continuation of application No. 13/181,409, filed on Jul. 12, 2011, now Pat. No. 8,924,563.

(51) Int. Cl.
*G06F 17/30* (2006.01)
*H04L 29/06* (2006.01)
*G06F 9/46* (2006.01)

(52) U.S. Cl.
CPC ...... *G06F 9/465* (2013.01); *G06F 2209/5017* (2013.01)

(56) References Cited

U.S. PATENT DOCUMENTS

2012/0284719 A1   11/2012   Phan et al.
2013/0232164 A1    9/2013   Bigney et al.

OTHER PUBLICATIONS

"Non-Final Office Action dated Feb. 28, 2014," U.S. Appl. No. 13/181,409, 13 pages.
"Notice of Allowance dates Sep. 10, 2014," U.S. Appl. No. 13/181,409, 7 pages.

WEB-BASED DISTRIBUTED COMPUTING WITH BROWSER-EXECUTED CODE

CROSS-REFERENCES TO RELATED APPLICATIONS

This application is a continuation of U.S. patent application Ser. No. 14/585,060, filed on Dec. 29, 2014, which is a continuation of U.S. patent application Ser. No. 13/181,409, filed on Jul. 12, 2011 of which the full disclosure of this application is incorporated herein by references for all purposes.

BACKGROUND

Networks of computers have become common, and even a commodity. A wide variety of techniques exist that arrange for a network of computers to co-operate towards achieving a goal, or a set of goals (i.e., to participate in a "distributed computing" task or application), however each has its drawbacks. Some techniques are handcrafted to suit particular applications. While some applications can justify the time and resources ("costs") required for custom techniques, there are many applications that would benefit from distributed computing but for which custom techniques are prohibitively expensive.

Some conventional distributed computing frameworks seek to address this issue, but many such frameworks incorporate cumbersome, heavyweight techniques and/or computer programming "platforms" that are still too costly for a large class of applications. Some conventional distributed computing frameworks can be at least moderately accessible with respect to some applications, but have other drawbacks. For example, some conventional distributed computing frameworks are associated with computer networks that have availability, cost and/or security issues, or with new computer network creation and maintenance techniques that have such issues. Even relatively modest barriers to participation can slow or prevent network establishment and/or growth to desired scales of thousands, millions and more of concurrently participating processors.

BRIEF DESCRIPTION OF THE DRAWINGS

Various embodiments in accordance with the present disclosure will be described with reference to the drawings, in which.

Same numbers are used throughout the disclosure and figures to reference like components and features, but such repetition of number is for purposes of simplicity of explanation and understanding, and should not be viewed as a limitation on the various embodiments.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In at least one embodiment, a reusable distributed computing framework is established in which contributors of computing resources (also called volunteers or donors herein) may participate by using a web browser ("browser") to visit a web page that incorporates a distributed computing participation component (a "donor page"). A distributed computing job provider may submit distributed computing jobs to a web-based distributed computing service. A distributed computing job may include browser-executable code ("job code") in accordance with a particular distributed computing programmatic interface and data ("job data") to be processed by the browser-executable code. For example, the browser-executable code may be specified with statements of a scripting language capable of being interpreted and/or executed by a web browser such as a scripting language in accordance with an ECMAScript standard including Javascript®. The web-based distributed computing service may assign independently processable portions of the job data ("work units") to browsers visiting a donor page ("donor browsers") for processing with the job code. Results returned by the donor browsers may be indexed and made available in real-time, as may a status of the distributed computing job such as with respect to processing the job data. The web-based distributed computing service may filter a set of available donor browsers with respect to particular features and/or functionality that may be required by the job code. Donors may control participation in a particular distributed computing job by opening or closing browser windows (including "tabbed" windows) and/or by navigating away from a donor page.

Figure 1:
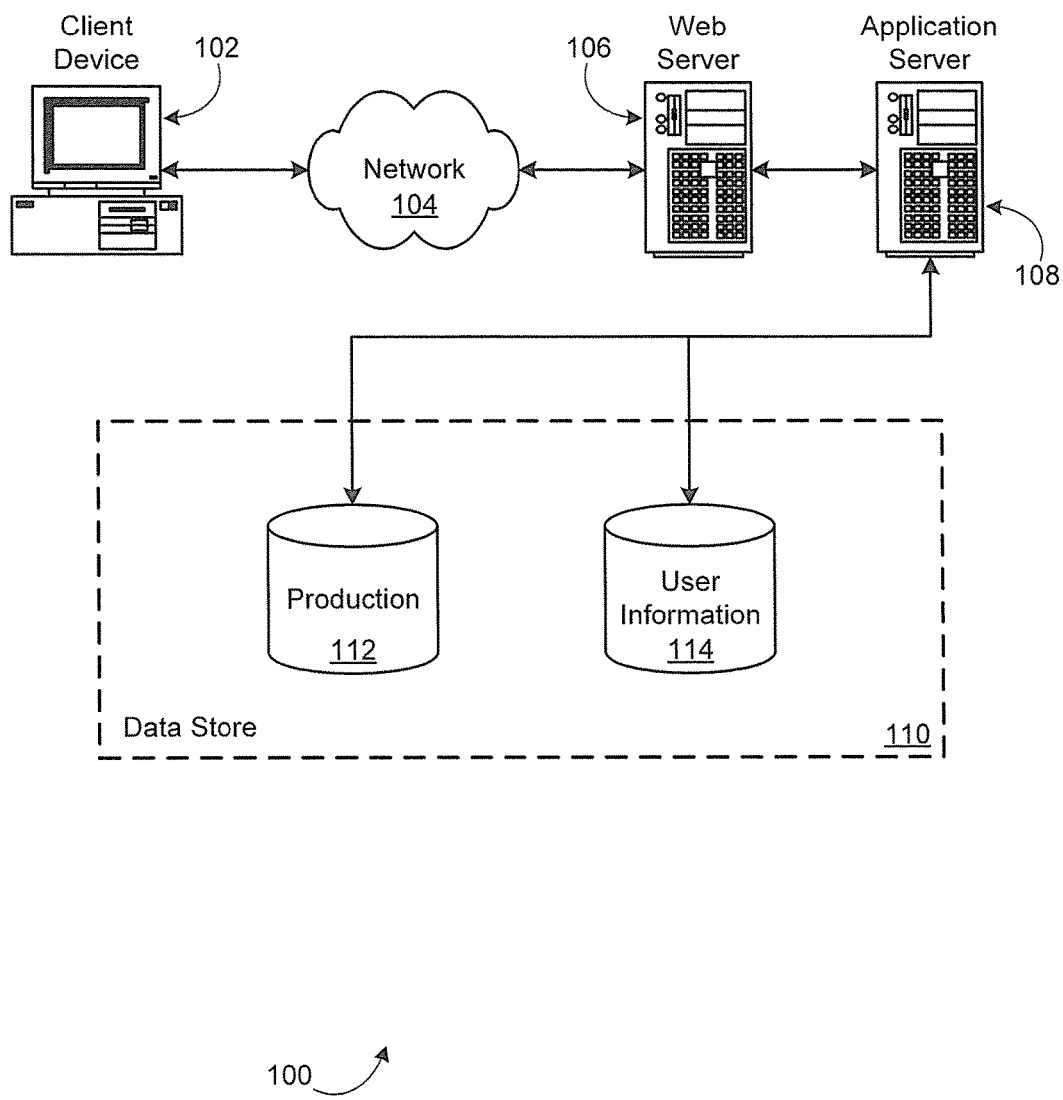
FIG. 1 is a schematic diagram illustrating an example environment for implementing aspects in accordance with at least one embodiment.

Various approaches may be implemented in various environments for various applications. For example, FIG. 1 illustrates aspects of an example environment 100 for implementing aspects in accordance with various embodiments. As will be appreciated, although a Web-based environment may be utilized for purposes of explanation, different environments may be utilized, as appropriate, to implement various embodiments. The environment 100 shown includes an electronic client device 102, which may include any appropriate device operable to send and receive requests, messages, or information over an appropriate network 104 and convey information back to a user of the device 102. Examples of such client devices include personal computers, cell phones, handheld messaging devices, laptop computers, tablet computers, set-top boxes, personal data assistants, electronic book readers, and the like.

The network 104 may include any appropriate network, including an intranet, the Internet, a cellular network, a local area network, a wide area network, a wireless data network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections, and combinations thereof. In this example, the network 104 includes the Internet, as the environment includes a Web server 106 for receiving requests and serving content in response thereto, although for other networks an alternative device serving a similar purpose could be utilized as would be apparent to one of ordinary skill in the art.

The illustrative environment 100 includes at least one application server 108 and a data store 110. It should be understood that there may be several application servers, layers, or other elements, processes, or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices, and data storage media, in any standard, distributed, or clustered environment.

The application server 108 may include any appropriate hardware and software for integrating with the data store as needed to execute aspects of one or more applications for the client device 102, and may even handle a majority of the data access and business logic for an application. The application server 108 provides access control services in cooperation with the data store 110, and is able to generate content such as text, graphics, audio, and/or video to be transferred to the user, which may be served to the user by the Web server 106 in the form of HTML, XML, or another appropriate structured language in this example.

The handling of all requests and responses, as well as the delivery of content between the client device 102 and the application server 108, may be handled by the Web server 106. It should be understood that the Web and application servers 106, 108 are not required and are merely example components, as structured code discussed herein may be executed on any appropriate device or host machine as discussed elsewhere herein. Further, the environment 100 may be architected in such a way that a test automation framework may be provided as a service to which a user or application may subscribe. A test automation framework may be provided as an implementation of any of the various testing patterns discussed herein, although various other implementations may be utilized as well, as discussed or suggested herein.

The data store 110 may include several separate data tables, databases, or other data storage mechanisms and media for storing data relating to a particular aspect. For example, the data store 110 illustrated includes mechanisms for storing production data 112 and user information 114, which may be utilized to serve content for the production side. It should be understood that there may be many other aspects that are stored in the data store 110, such as for page image information and access right information, which may be stored in any of the above listed mechanisms as appropriate or in additional mechanisms in the data store 110.

The data store 110 is operable, through logic associated therewith, to receive instructions from the application server 108, and obtain, update, or otherwise process data in response thereto. In one example, a user might submit a search request for a certain type of item. In this case, the data store 110 might access the user information 114 to verify the identity of the user, and may access the catalog detail information to obtain information about items of that type. The information then may be returned to the user, such as in a results listing on a Web page that the user is able to view via a browser on the user device 102. Information for a particular item of interest may be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
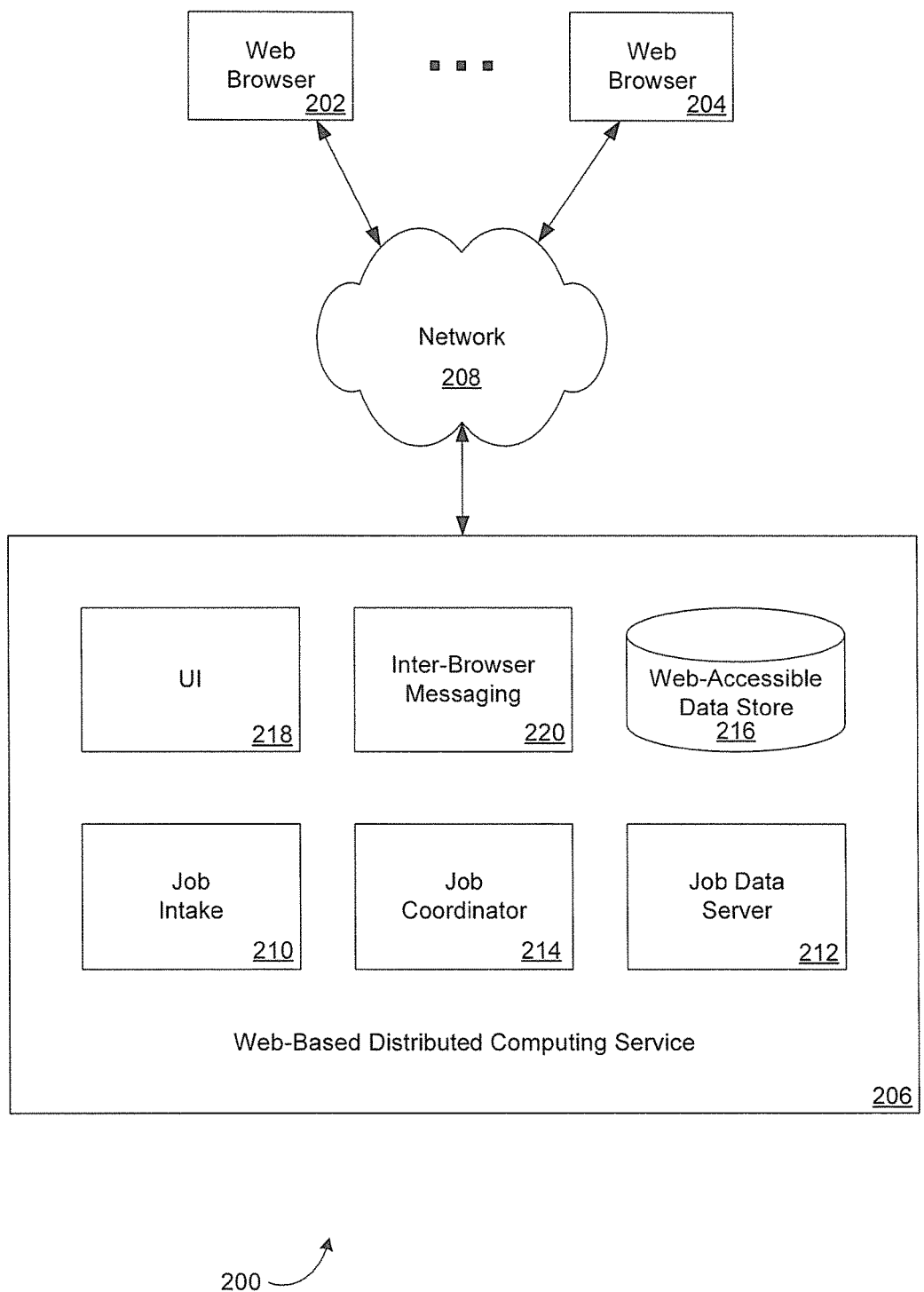
FIG. 2 is a schematic diagram depicting aspects of an example computing system architecture in accordance with at least one embodiment.

FIG. 2 depicts an example computing system architecture 200 in accordance with at least one embodiment. The architecture 200 includes web browsers 202-204 communicatively connected to a web-based distributed computing service 206 through a network 208. The architecture 200 may incorporate and/or be incorporated by one or more aspects of the environment 100 depicted in FIG. 1. For example, the web browsers 202-204 may be incorporated into a suitable client device 102, the network 208 may incorporate and/or be incorporated by the network 104, and the web-based distributed computing service 206 may be implemented by a set of computing resources including one or more computing resources serving in roles corresponding to the Web server 106, the application server 108 and/or the data store 110. The ellipsis between the web browser 202 and the web browser 204 in FIG. 2 indicates that the architecture 200 may include any suitable number of web browsers such as thousands, millions and more. The web browsers 202-204 may include any suitable type of web browser including stand-alone web browsers, such as Microsoft® Internet Explorer™, Mozilla Firefox®, Google Chrome™ and Apple® Safari®, and applications that incorporate web browser components and/or functionality, as well as multiple different types of web browser.

The web-based distributed computing service 206 may include a job intake component 210 configured at least to receive distributed computing jobs from job providers and validate the distributed computing jobs with respect to requirements of the web-based distributed computing service 206. Job data from accepted distributed computing jobs (which may be very large in size such as megabytes, gigabytes and more) may be made accessible as work units by a job data server 212. The work units may be assigned to donor browsers by a job coordinator component 214. The job coordinator 214 may also receive processing results and make the results available in a web-accessible data store 216, as well as service job status requests. A user interface 218, for example, incorporating a web-based graphical user interface, may facilitate interaction by providers and contributors with the various components of the web-based distributed computing service 206. For example, the user interface 218 may maintain a distributed computing job submission web page, an accepted job management web page, and a donor page. An inter-browser messaging component 220 may facilitate messaging between web browsers 202-204 including publish-subscribe type messaging in which donor browsers may subscribe to announcements of accepted distributed computing jobs having work units available for processing.

In accordance with at least one embodiment, the job coordinator component 214 may cache and index processing results corresponding to work unit assignments. The processing results may be thereby made available in real-time to job providers. Such real-time access to processing results may enable job providers and/or job code developers to modify job code responsive to discoveries and/or coding errors (sometimes called "bugs"). Such access may be incorporated into and/or made available to debugging tools and/or debugging environments adapted to browser-executable code, including front-end "in-browser" debugging tools. Such real-time feedback to job code developers can enable a "rapid iteration" mode of job code development that can yield high quality code and/or processing results with a relatively modest expenditure of code development resources (e.g., developer person-hours).

In accordance with at least one embodiment, one or more of the components of the web-based distributed computing service may themselves be at least partially distributed. For example, functionality of the job intake component 210 and/or the job coordinator component 214 may be distributed to one or more web browsers 202-204 viewing the distributed computing job submission web page, the accepted job management web page and/or the donor page. Such functionality may be implemented with browser-executable code incorporated into and/or "loaded" into the web browser by the viewed web page and/or as part of "loading" the web page to be viewed. In accordance with at least one embodiment, substantially all of the functions of the job intake component 210 and/or the job coordinator component 214 may be performed by one of the web browsers 202-204 executing browser-executable code.

Figure 3:
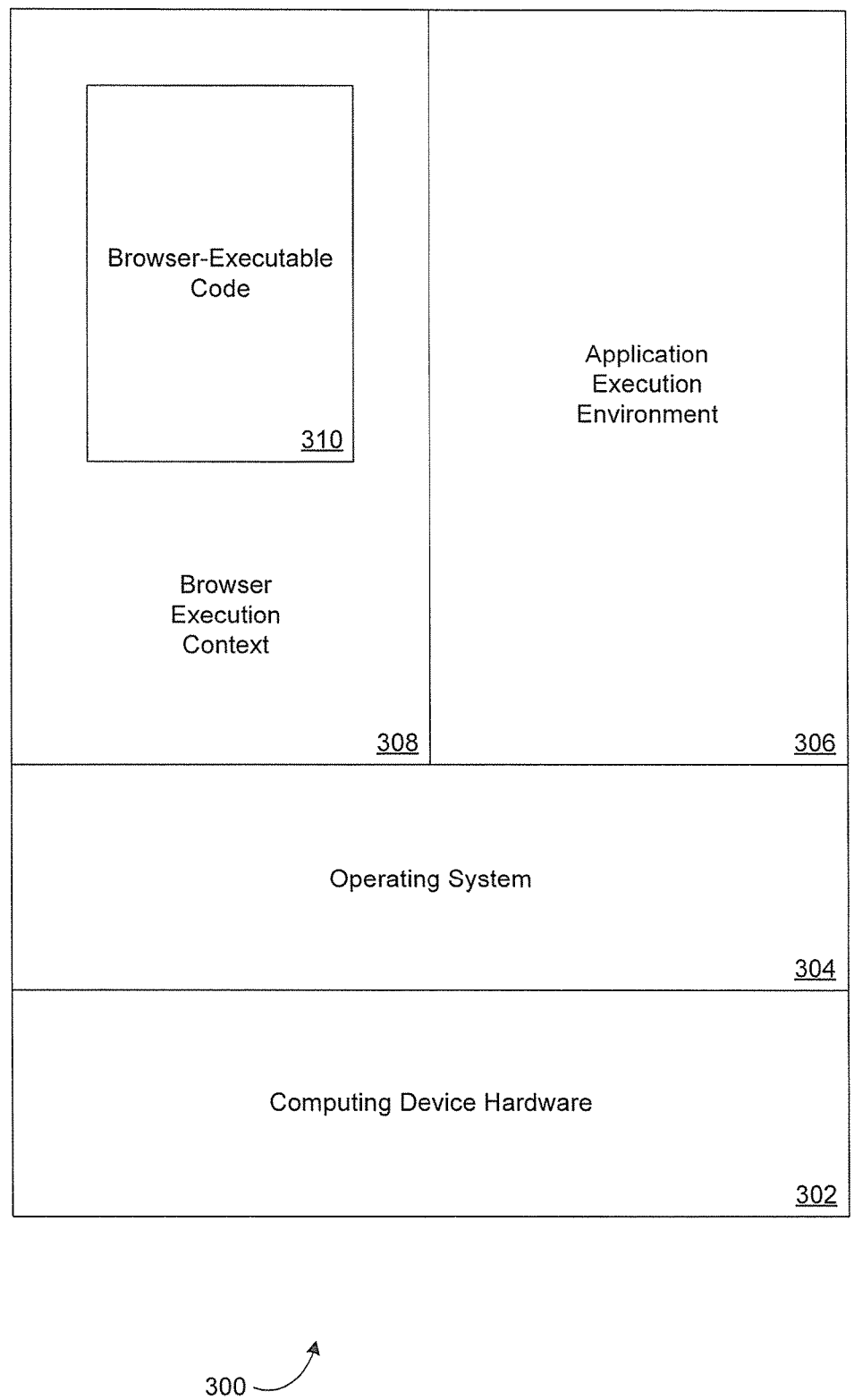
FIG. 3 is a schematic diagram depicting aspects of an example job code execution environment in accordance with at least one embodiment.

As described above, web browsers 202-204 (FIG. 2), and in particular donor browsers, may be incorporated and/or implemented by a client device 102 (FIG. 1). FIG. 3 depicts aspects of an example job code execution environment 300 in accordance with at least one embodiment. The execution environment 300 may include a set of computing device hardware 302 including one or more processors and/or processing cores. An operating system 304 may mediate access to the computing device hardware from an application execution environment 306 (sometimes called a "user space"). The application execution environment 306 may host various components implementing applications of the computing device hardware 302, including a web browser such as the web browsers 202-204 of FIG. 2.

The web browsers 202-204 (FIG. 2) may establish a browser execution context 308 providing browser-executable code 310 mediated access to the application execution environment 306 and/or the operating system 304. The browser execution context 308 maintains a set of standards with respect to security and/or performance impacts, for example, when browsing the Web and/or Internet. Such standards may include standards with respect to programmatic functionality such as the "ECMAScript Language Specification," Standard ECMA-262, 5$^{th}$ Edition, December 2009, and standards with respect to programmatic objects available for manipulation such as programmatic objects in accordance with a hypertext or XML document object model (DOM), for example, the "Document Object Model (DOM) Level 3 Core Specification," W3C Recommendation, Version 1.0, April 2004. A web browser 202-204 may establish multiple browser execution contexts corresponding to the browser execution context 308, for example, a browser execution context may be established for each browser window. Each browser execution context may be associated with one or more threads of execution in the operating system 304 and, when the computing device hardware 302 includes multiple processors and/or processing cores, each browser execution context may be associated with a distinct processor and/or processing core.

Figure 4:
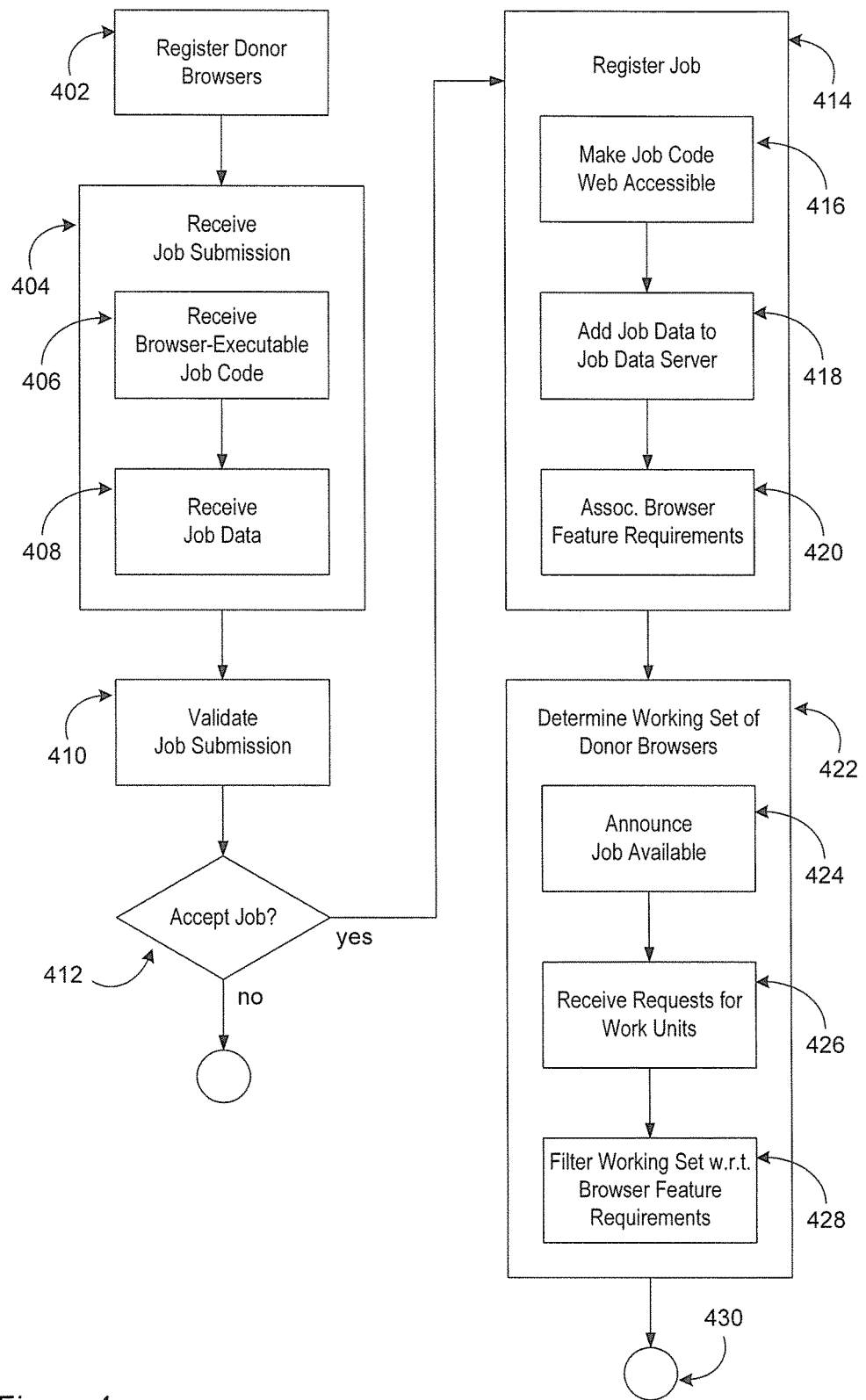
FIG. 4 is a flowchart depicting example steps for a web-based distributed computing service in accordance with at least one embodiment.

FIG. 4 depicts example steps for a web-based distributed computing service in accordance with at least one embodiment. At step 402, donor browsers may be registered. For example, some of the web browsers 202-204 (FIG. 2) may visit a donor page (i.e., become donor browsers), and the distributed computing participation component incorporated in the donor page (and activated by the donor browser) may indicate to the web-based distributed computing service 206 that the donor browser is a candidate for work unit assignment. The distributed computing participation component need not be visibly rendered as part of the donor page (e.g., the distributed computing participation component may be invisible to some, most or all users and/or donor page visitors). However, in accordance with at least one embodiment, the distributed computing participation component may be responsible for providing information renderable by a web browser (e.g., may exercise control over at least a portion of the donor page with respect to presentation).

At step 404, a request for a distributed computing job may be received. For example, the job intake component 210 may receive the request from one of the web browsers 202-204 and/or the user interface 218. Receiving the request at step 404 may include receiving job code (step 406) and receiving job data (step 408).

At step 410, the request for the distributed computing job received at step 404 may be validated. For example, the job intake component 210 (FIG. 2) may check that the received distributed computing job request conforms to a set of requirements of the web-based distributed computing service 206. Such requirements may include that the associated job code properly implements a particular distributed computing interface (e.g., so that the distributed computing participation component can activate the job code), does not access prohibited browser execution context functionality and/or is otherwise well-behaved with respect to specified security and/or performance boundaries, and that the associated job data has detectable (e.g., explicitly delimited) independently processable portions suitable for assignment as work units. The validation of step 410 may include validation that the job submitter is authorized to submit jobs, to submit jobs of the submitted type and/or to submit jobs having estimated resource utilization levels of the submitted job.

At step 412, a decision whether to accept the requested distributed computing job may be made, for example, by the job intake component 210. If the requested distributed computing job is accepted, a procedure incorporating step 412 may progress to step 414. Otherwise, the procedure may exit.

At step 414, the requested distributed computing job may be registered, for example, with the web-based distributed computing service 206 (FIG. 2). As part of step 414, the job code may be made web-accessible (step 416). For example, the job intake component 210 may add the job code to the web-accessible data store 216. The distributed computing job may have an associated identifier (e.g., a name provided as part of the submission of step 404 and/or as generated by the job intake component 210), and the job code may be indexed in the web-accessible data store 216 with the identifier, for example, the identifier may be incorporated into a uniform resource locator (URL) utilizable by web browsers 202-204 to access the job code. At step 418, the job data may be made accessible as work units. For example, the job intake component 210 provide the submitted job data to the job data server 212, and the job data server 212 may make the job data available as work units. At step 420, the accepted distributed computing job may be associated with a set of browser feature requirements. For example, the job intake component 210 may parse the job code (e.g., during the validation step 410) to detect features of the browser execution environment 308 (FIG. 3) that are utilized by the job code. The set of browser feature requirements of step 420 may include features utilized by the job code that are unsupported by some web browsers 202-204 and/or groups or classes of features, for example, defined by associated standards or arising in practice from vendor incompatibilities.

At step 422, a working set of donor browsers may be determined for the submitted distributed computing job. For example, the job coordinator component 214 (FIG. 2) may select the working set from the set of donor browsers registered at step 402 taking into account other distributed computing jobs that are competing for donor browser resources and the set of browser feature requirements (if any) associated with the submitted distributed computing job at step 420. The job coordinator component 214 may utilize any suitable task assignment, allocation and/or scheduling algorithm to select the working set of step 422. Alternatively, or in addition, the accepted distributed processing job may be announced (step 424) to the set of registered donor browsers as having work units available for processing, for example, with the inter-browser messaging service 220, and the job coordinator component 214 may receive requests for work units from at least a subset of the registered donor browsers (step 426). The work units requests of step 426 may identify and/or be associated with capabilities of the registered donor browsers, and the job coordinator component 214 may filter the request with respect to the set of browser feature requirements for the job (step 428) to determine the working set. The set of browser features associated with particular donor browsers may be determined during registration (e.g., step 402). For example, donor browsers may provide a specification of their features during registration in accordance with a suitable browser feature specification standard.

Figure 5:
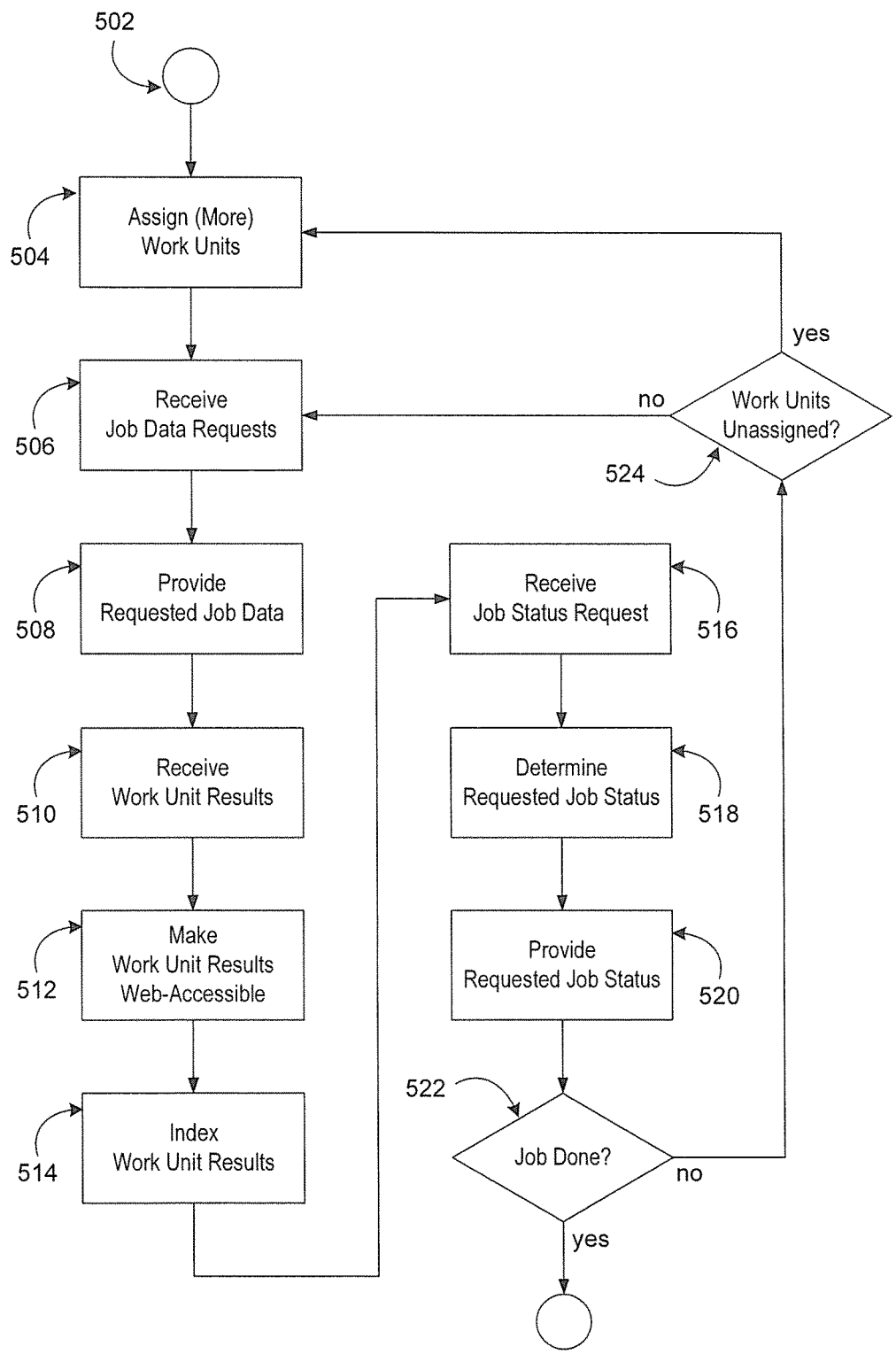
FIG. 5 is a flowchart depicting further example steps for the web-based distributed computing service in accordance with at least one embodiment.

The circle 430 shown in FIG. 4 connects the flowchart of FIG. 4 to the flowchart of FIG. 5 via corresponding circle 502. FIG. 5 depicts further example steps for the web-based distributed computing service in accordance with at least one embodiment. At step 504, work units may be assigned. For example, the job coordinator component 214 may assign work units to the working set of donor browsers determined at step 422. Again, the job coordinator component 214 may utilize any suitable assignment, allocation and/or scheduling algorithm to assign the work units. The work units may correspond to portions of the job data that overlap, and duplicate work units may be assigned to distinct donor browsers, for example, to compensate for donor browser "churn" (e.g., navigating away from the donor page) and/or processing errors (e.g., due to underlying hardware malfunction). In at least one embodiment, the work units correspond to a partition of the job data into disjoint and independently processable subsets. As part of step 504, donor browsers may be notified of assigned work units.

At step 506, requests for job data work units may be received. For example, responsive to being notified of work unit assignments, donor browsers in the working set may request the portion of the job data corresponding to the assigned work unit(s). Each work unit may be associated with an identifier (e.g., assigned by the job data server 212 of FIG. 2), and the identifier (or range of identifiers) may be included in the requests of step 506. At step 508, the requested work units may be provided. For example, the job data server 212 may provide the work units to the requesting donor browsers.

At step 510, results corresponding to work units may be received. For example, the job coordinator component 214 (FIG. 2) may receive the results corresponding to assigned work units of job data processed with the job code made web-accessible at step 416 (FIG. 4). The work unit results may be made web-accessible (step 512), for example, by storing the results in the web-accessible data store 216, referenced at least in part by the distributed computing job identifier, and may be indexed (step 514), for example, by one or more work unit result fields specified as part of the distributed computing job submission of step 404. At times, the results received at step 510 may correspond to and/or be associated with processing errors. In such cases, an error status may be associated with a particular assigned work unit (e.g., at the job data server 212).

While work unit results are being received, job status requests may also be received (step 516). For example, the distributed computing job provider may make a job status request (e.g., through the user interface 218 of FIG. 2 and/or while the provider is visiting a job management page with a web browser) with respect to work unit processing status. A given work unit make have a status of: unassigned, assigned and waiting for results, results received, and/or processing error occurred. The job status request may also request work unit processing statistics including with respect to processing time and proportion of all work units associated with a particular set of job data with each type of status. At step 518, the requested job status may be determined, for example, by the job coordinator 214, and provided to the requestor (step 520). The job coordinator 214 may interact with the other components of the web-based distributed computing service 206 to determine the requested job status. For example, the job coordinator 214 may query the job data server 212 for any error status data associated with assigned work units.

At step 522, a job done condition may be detected. If the distributed processing job is complete (e.g., each portion of the job data is associated with a results received or processing error occurred status), the procedure may exit. Otherwise, the procedure may progress to step 524. At step 524, a work units unassigned condition may be detected. For example, the job coordinator 214 may determine that one or more of the portions of the job data is associated with an unassigned status or some processing error occurred status conditions (e.g., timeout, work unit abandoned). If there are work units requiring assignment and/or reassignment, the procedure may progress to step 504. Otherwise, the procedure may progress to step 506 to continue until the distributed computing job is complete. Although registration of donor browsers is shown as an initial step (step 402 of FIG.

4), in accordance with at least one embodiment, registration and/or deregistration of donor browsers may occur throughout procedures that incorporate the steps depicted in FIG. 4 and FIG. 5. For example, a procedure revisiting step 504 may find a larger or smaller candidate pool of donor browsers.

Figure 6:
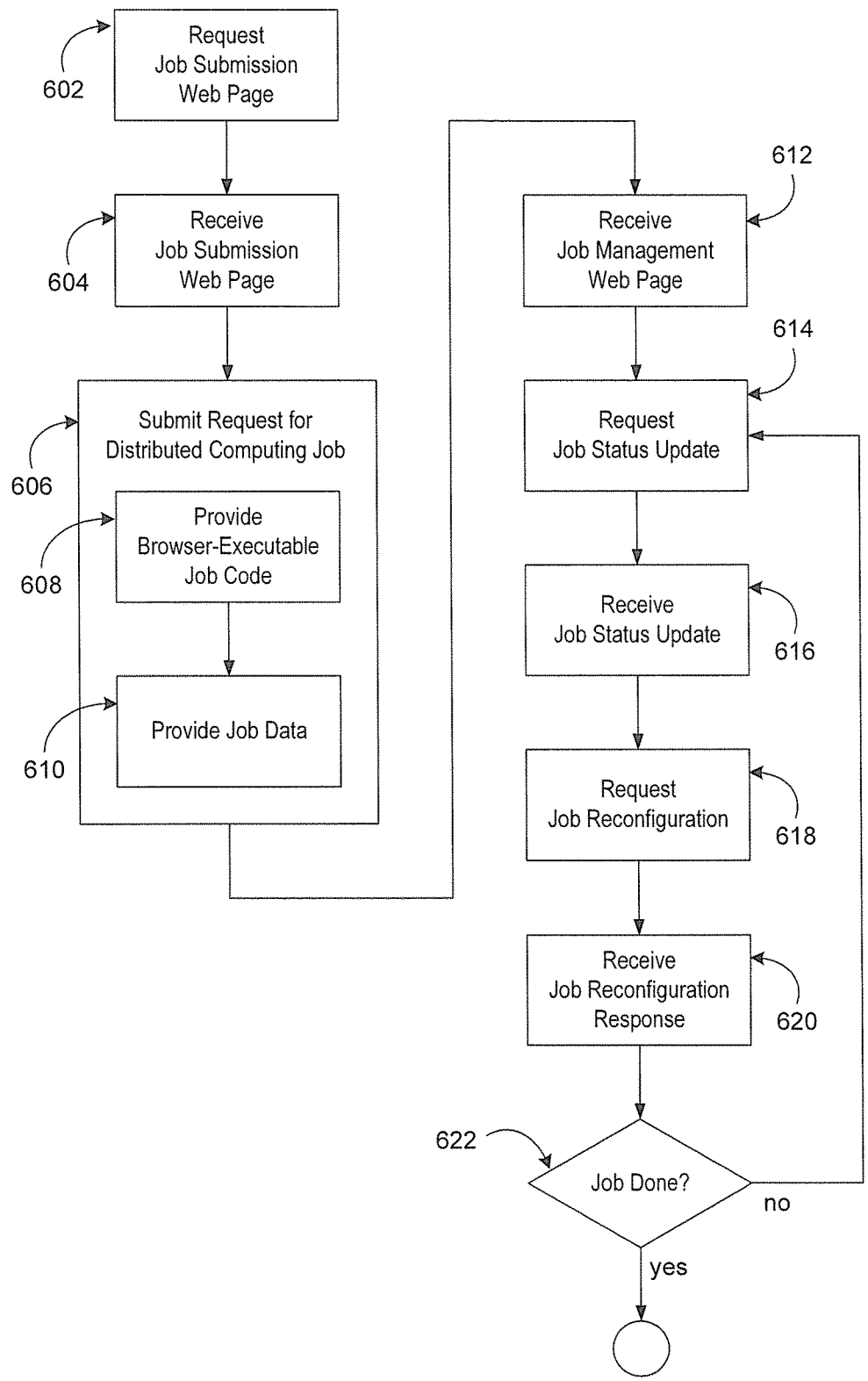
FIG. 6 is a flowchart depicting example steps for a distributed computing job provider in accordance with at least one embodiment.

FIG. 6 depicts example steps for a distributed computing job provider in accordance with at least one embodiment. At step 602, a job submission web page may be requested and received (step 604). For example, the distributed computing job provider may request the job submission web page from the user interface 218 (FIG. 2) with one of the web browsers 202-204. At step 606, a request for a distributed computing job may be submitted. For example, the distributed computing job provider may interact with the job submission web page and/or the user interface 218 to specify and provide the request to the job intake component 210. Submitting the request may include specifying and providing browser-executable code for the job (step 608), as well as data for the job (step 610) to be processed by the browser-executable code.

At step 612, a job management web page may be received, for example, responsive to the submission of step 606. If the request distributed computing job is accepted by the web-based distributed computing service 206 (FIG. 2), the job management web page may provide for job status monitoring and control. For example, the job management web page may enable the distributed computing job provider to stop, pause, restart, re-specify and/or reconfigure the distributed computing job including indicating priorities for sets of work units and/or requiring re-processing or re-assignment of work units. Job status updates may be requested (step 614) and received (step 616), for example, by the distributed computing job provider, by the user interface 218 and/or by the browser visiting the job management web page. Such requests may be serviced by the job coordinator component 214 as described above with reference to FIG. 5. Job reconfigurations and/or re-specifications may also be requested (step 618) and associated responses received (step 620). Such reconfigurations and/or re-specifications may require re-validation by the job intake component 210, for example, as described above with reference to FIG. 4.

At step 622, a job done condition may be detected, for example, by the user interface 218 (FIG. 2) maintaining the job management web page and/or based on a job status update received at step 618. If the job done condition is detected, the job management web page may so indicate and a procedure incorporating step 622 may exit. Otherwise, the procedure may return to step 614 as part of maintaining the job management web page.

Figure 7:
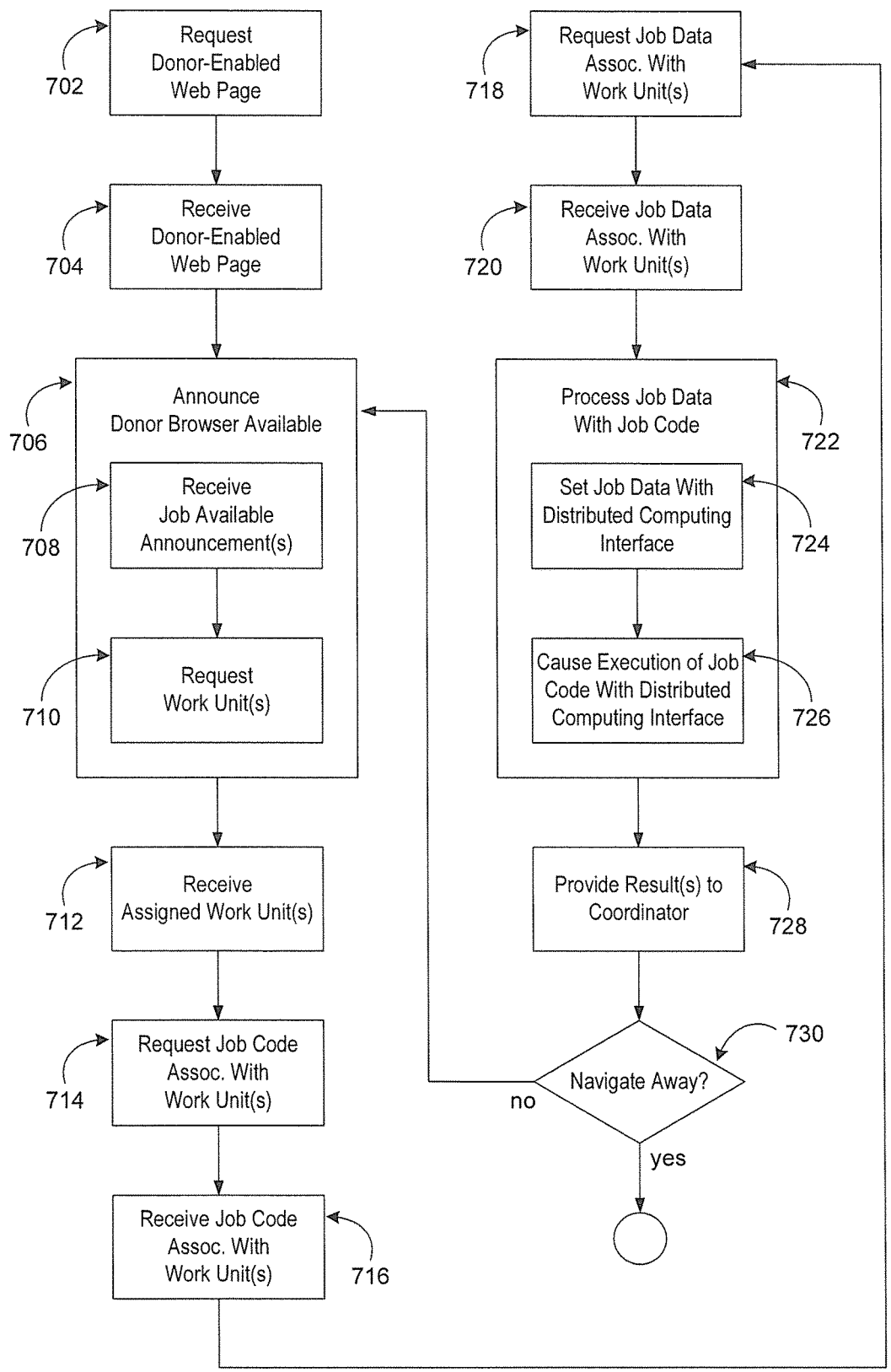
FIG. 7 is a flowchart depicting example steps for a distributed computing job contributor in accordance with at least one embodiment.

FIG. 7 depicts example steps for a distributed computing job contributor in accordance with at least one embodiment. A donor-enabled web page may be requested (step 702) and received (step 704). For example, one of the web browsers 202-204 (FIG. 2) may request a web page incorporating the distributed computing participation component from the user interface 218 or an independent web server (not shown in FIG. 2). In at least one embodiment, the distributed computing participation component is implemented with browser-executable code. The distributed computing participation component may be configured to periodically and/or occasionally refresh (e.g., reload) itself and/or the donor-enabled web page.

At step 706, a donor browser available announcement may be made. For example, the distributed computing participation component maintained by the web browser that received the donor-enabled web page at step 704 may notify the inter-browser messaging service 220 (FIG. 2) and/or the web-based distributed computing service 206 of the availability of computing resources associated with the web browser for processing work units. Alternatively, or in addition, the donor browser available announcement may correspond to subscribing to one or more distributed computing job available announcements. Responsive to such subscriptions, the distributed computing participation component and/or the donor browser (collectively, "the donor browser") may receive one or more distributed computing job available announcements (step 708). Responsive to such availability, the donor browser may request (step 710) one or more work units for processing. For example, such requests may be submitted to the job coordinator component 214. At step 712, one or more assigned work units may be received, for example, by the donor browser from the job coordinator component 214.

Responsive to receiving the work unit assignment(s) of step 712, associated job code may be requested (step 714) and received (step 716), and associated job data may be requested (step 718) and received (step 720). For example, the donor browser may request and receive the job code associated with the work unit assignment(s) from the web-accessible data store 216 utilizing a distributed computing job identifier included in the work unit assignment(s). The donor browser may request and receive the job data work units from the job data server 212 utilizing the distributed computing job identifier and work unit identifiers included in the work unit assignment(s).

At step 722, the job data received at step 720 may be processed with the job code received at step 716. For example, the job code may conform to a distributed computing interface having one or more interface elements enabling specification of one or more job data work units and execution of the job code with respect to the one or more job data work units, and step 722 may include indicating the job data work unit(s) to be processed (step 724) and causing execution of the job code with respect to the job data work unit(s) (step 726) utilizing the distributed computing interface. By utilizing the distributed computing interface, job code execution may be monitored, for example, with respect to security and/or performance expectations. In accordance with at least one embodiment, one or more alarm "interrupts" may be set, and expected alarm times compared with observed clock times. "Late" alarms may indicate that computing resources available to the donor browser are overtaxed, and the donor browser may suspend participation (e.g., deregister, delay further availability announcements) until the computing resources are no longer overtaxed. At step 728, results of the processing of step 722 (including any error status data) may be provided to a coordinator, for example, the donor browser may provide the results to the job coordinator component 214 (FIG. 2).

At step 730, a navigate away condition may be detected. For example, a user of the donor browser may navigate away from the donor-enabled web page and/or close an associated browser window, causing a communication session and/or connection with the inter-browser messaging service 220 and/or the web-based distributed computing service 206 to terminate. If the navigate away condition is detected, a procedure incorporating step 730 may exit. Otherwise, the procedure may progress to step 706 to announce (explicitly and/or implicitly) that the donor browser is available to receive further work units. In at least one embodiment, the navigate away condition may occur and be detected during or after any step in FIG. 7 after step 704.

The various embodiments described herein may be implemented in a wide variety of operating environments, which in some cases may include one or more user computers, computing devices, or processing devices which may be utilized to operate any of a number of applications. User or client devices may include any of a number of general purpose personal computers, such as desktop or laptop computers running a standard operating system, as well as cellular, wireless, and handheld devices running mobile software and capable of supporting a number of networking and messaging protocols. Such a system also may include a number of workstations running any of a variety of commercially-available operating systems and other known applications for purposes such as development and database management. These devices also may include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. Such a network may include, for example, a local area network, a wide-area network, a virtual private network, the Internet, an intranet, an extranet, a public switched telephone network, an infrared network, a wireless network, and any combination thereof. The network may, furthermore, incorporate any suitable network topology. Examples of suitable network topologies include, but are not limited to, simple point-to-point, star topology, self organizing peer-to-peer topologies, and combinations thereof.

In embodiments utilizing a Web server, the Web server may run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also may include a computer-readable storage media reader, a communications device (e.g., a modem, a network card (wireless or wired), an infrared communication device, etc.), and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules including program modules, services, or other elements located within at least one working memory device, including an operating system and application programs, such as a client application or Web browser. It should be appreciated that alternate embodiments may have numerous variations from that described above. For example, customized hardware might also be utilized and/or particular elements might be implemented in hardware, software (including portable software, such as applets), or both. Further, connection to other computing devices such as network input/output devices may be employed.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which may be utilized to store the desired information and which may be accessed by the a system device. Program modules, program components and/or programmatic objects may include computer-readable and/or computer-executable instructions of and/or corresponding to any suitable computer programming language. In at least one embodiment, each computer-readable medium may be tangible. In at least one embodiment, each computer-readable medium may be non-transitory in time. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computing system, comprising:
   a processor;
   memory including instructions that, when executed by the processor, cause the computing system to:
   receive a request for a distributed computing job, the request including data and browser-executable code that conforms to a distributed computing interface;
   assign each of different portions of the data to a browser of a plurality of browser to be processed with the browser-executable code;
   receive data processing results corresponding to each of the different portions of the data, the data processing results generated at least in part by execution of the browser-executable code at the plurality of browsers in accordance with the distributed computing interface;
   determine a status of the distributed computing job based at least in part on the received data processing results; and
   reconfigure, based at least in part on the status, at least a portion of the distributed computing job.

2. The computing system of claim 1, wherein the instructions, when executed to reconfigure the distributed computing job, further cause the computing system to:
   provide a job status monitoring and control interface; and
   receive one of a set of job reconfiguration parameters or a set of re-specifications parameters via the job status monitoring and control interface.

3. The computing system of claim 2, further comprising a web-accessible data store configured at least to store the browser-executable code and the results, wherein the instructions, when executed, further cause the computing system to:
   provide an update status of the distributed computing job for presentation based at least in part on implementing one of the set of job reconfiguration parameters or the set of re-specifications parameters; and
   store the update status with the results.

4. The computing system of claim 2, wherein the job status monitoring and control interface further enables the distributed computing job provider to perform at least one of stopping the distributed computing job, pausing the distributed computing job, restarting the distributed computing job, or setting priorities for tasks of the distributed computing job.

5. The computing system of claim 1, wherein the instructions, when executed, further cause the computing system to:
   parse the browser-executable code to determine a set of browser feature requirements; and
   select the plurality of browsers, from a pool of candidate browsers, based at least in part on the set of browser feature requirements.

6. The computing system of claim 1, wherein the instructions, when executed, further cause the computing system to:
   select a browser from the plurality of browsers, wherein the plurality of browsers become eligible to participate in the plurality of distributed computing jobs at least in part by visiting a web page;
   identify a first browser tab and a second browser tab of the browser, the first browser tab and the second browser tab being configured to execute the browser-executable code;
   assign a first portion of the data to the first browser tab and a second portion of the data to the second browser tab of the browser, the first portion of the data and the second portion of the data configured to be processed using the browser-executable code; and
   receive results corresponding to the first portion of the data and the second portion of the data, the results in accordance with execution of the browser-executable code in the first browser tab and the second browser tab.

7. The computing system of claim 6, wherein the instructions, when executed to assign the first portion of the data and the second portion of the data, further cause the computing system to:
   partition the data into one or more portions; and
   assign the one or more portions to at least one of the first browser tab or the second browser tab.

8. The computing system of claim 6, wherein execution of the first browser tab is associated with a first processing core configured to execute the browser-executable code to process the first portion of the data and execution of the second browser tab is associated with a second processing core configured to execute the browser-executable code to process the second portion of the data.

9. The computing system of claim 1, wherein the data and the browser-executable code are associated with the distributed computing job of a plurality of distributed computing jobs, each distributed computing job being associated with data that conforms to a specified format and browser-executable code that conforms to a distributed computing interface,
   wherein the specified format includes a plurality of independently processable data blocks and the distributed computing interface includes an interface element that initiates processing of at least one of the plurality of independently processable data blocks by the browser-executable code.

10. A method, comprising:
  receiving a request for a distributed computing job, the request including data and browser-executable code that conforms to a distributed computing interface;
  assigning each of different portions of the data to a browser of a plurality of browser to be processed with the browser-executable code;
  receiving data processing results corresponding to each of the different portions of the data, the data processing results generated at least in part by execution of the browser-executable code at the plurality of browsers in accordance with the distributed computing interface;
  determining a status of the distributed computing job based at least in part on the received data processing results; and
  reconfiguring, based at least in part on the status, at least a portion of the distributed computing job.

11. The method according to claim 10, further comprising:
  providing a job status monitoring and control interface; and
  receiving one of a set of job reconfiguration parameters or a set of re-specifications parameters via the job status monitoring and control interface.

12. The method according to claim 11, further comprising:
  providing an update status of the distributed computing job for presentation based at least in part on implementing one of the set of job reconfiguration parameters or the set of re-specifications parameters.

13. The method according to claim 10, further comprising:
  parsing the browser-executable code to determine a set of browser feature requirements; and
  selecting the plurality of browsers, from a pool of candidate browsers, based at least in part on the set of browser feature requirements.

14. The method according to claim 10, further comprising:
  selecting a browser from the plurality of browsers;
  identifying a first browser tab and a second browser tab of the browser, the first browser tab and the second browser tab being configured to execute the browser-executable code;
  assigning a first portion of the data to the first browser tab and a second portion of the data to the second browser tab of the browser, the first portion of the data and the second portion of the data configured to be processed using the browser-executable code; and
  receiving results corresponding to the first portion of the data and the second portion of the data, the results in accordance with execution of the browser-executable code in the first browser tab and the second browser tab.

15. The method according to claim 14, wherein assigning the first portion of the data and the second portion of the data further includes:
  partitioning the data into one or more portions; and
  assigning the one or more portions to at least one of the first browser tab or the second browser tab.

16. The method according to claim 10, wherein the browser-executable code comprises executable code specified with a scripting language, and wherein wherein the scripting language comprises a scripting language in accordance with an ECMAScript standard.

17. A non-transitory computer readable storage medium storing one or more sequences of instructions executable by one or more processors to perform a set of operations comprising:
  receiving a request for a distributed computing job, the request including data and browser-executable code that conforms to a distributed computing interface;
  assigning each of different portions of the data to a browser of a plurality of browser to be processed with the browser-executable code;
  receiving data processing results corresponding to each of the different portions of the data, the data processing results generated at least in part by execution of the browser-executable code at the plurality of browsers in accordance with the distributed computing interface;
  determining a status of the distributed computing job based at least in part on the received data processing results; and
  reconfiguring, based at least in part on the status, at least a portion of the distributed computing job.

18. The non-transitory computer readable storage medium of claim 17, further comprising instructions executed by the one or more processors to perform the set of operations of:
  each portion of the data is assigned to at least one of the plurality of browsers; and
  the data and the browser-executable code are associated with a distributed computing job that is complete when a valid result is received corresponding to each of the assigned portions of the data.

19. The non-transitory computer readable storage medium of claim 17, wherein the status is repeatedly determined and provided for presentation until the distributed computing job is complete.

20. The non-transitory computer readable storage medium of claim 17, further comprising instructions executed by the one or more processors to perform the set of operations of:
  providing a job status monitoring and control interface;
  receiving one of a set of job reconfiguration parameters or a set of re-specifications parameters; and
  providing an update status of the distributed computing job for presentation based at least in part on implementing one of the set of job reconfiguration parameters or the set of re-specifications parameters.

* * * * *